US011548796B2

(12) United States Patent
Aljedaani et al.

(10) Patent No.: US 11,548,796 B2
(45) Date of Patent: Jan. 10, 2023

(54) HUMIDIFICATION DEHUMIDIFICATION PROCESSES USING WASTE HEAT EXTRACTED FROM ABANDONED WELLS

(71) Applicant: SAUDI ARABIAN OIL COMPANY, Dhahran (SA)

(72) Inventors: Abdulrahman Aljedaani, Dhahran (SA); Mohammed Badri AlOtaibi, Dhahran (SA); Subhash Chandrabose Ayirala, Dhahran (SA); Ali Abdallah Al-Yousef, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 17/197,441

(22) Filed: Mar. 10, 2021

(65) Prior Publication Data

US 2022/0289596 A1 Sep. 15, 2022

(51) Int. Cl.
*C02F 1/16* (2006.01)
*C02F 1/04* (2006.01)
*C02F 1/00* (2006.01)
*B01D 1/00* (2006.01)
*C02F 103/10* (2006.01)

(52) U.S. Cl.
CPC ............ *C02F 1/16* (2013.01); *B01D 1/0058* (2013.01); *B01D 1/0082* (2013.01); *C02F 1/001* (2013.01); *C02F 1/008* (2013.01); *C02F 1/048* (2013.01); *C02F 2103/10* (2013.01); *C02F 2209/02* (2013.01); *C02F 2209/40* (2013.01); *C02F 2301/046* (2013.01); *C02F 2301/066* (2013.01)

(58) Field of Classification Search
CPC .......... C02F 1/001; C02F 1/008; C02F 1/048; C02F 1/16; C02F 2103/10; C02F 2209/02; C02F 2209/40; C02F 2301/046; C02F 2301/066; B01D 1/0058; B01D 1/0082
See application file for complete search history.

(56) References Cited

U.S. PATENT DOCUMENTS 6,536,523 B1 * 3/2003 Kresnyak ................ E21B 43/40
166/266
7,438,129 B2 * 10/2008 Heins .................. E21B 43/2406
159/901
9,643,102 B2 5/2017 Al-Sulaiman et al.
(Continued)

OTHER PUBLICATIONS

Ghaffour, Noreddine et al., "Renewable energy-driven desalination technologies: A comprehensive review on challenges and potential applications of integrated systems", Elsevier B.V., Oct. 2014, pp. 1-62 (63 pages).
(Continued)

*Primary Examiner* — Jonathan Miller
(74) *Attorney, Agent, or Firm* — Osha Bergman Watanabe & Burton LLP

(57) ABSTRACT

A method may include providing a humidification-dehumidification unit proximate one or more abandoned wells, circulating a water feed through the one or more abandoned wells, using geothermal heat in the one or more abandoned wells to heat the water feed, directing the heated water feed to the humidification-dehumidification unit, and treating the heated water feed in the humidification-dehumidification unit to provide purified water.

16 Claims, 4 Drawing Sheets

(56) References Cited

U.S. PATENT DOCUMENTS

| | | | | |
|---|---|---|---|---|
| 2010/0224364 A1* | 9/2010 | Heins | .................... | C02F 1/048 |
| | | | | 166/267 |
| 2014/0262137 A1* | 9/2014 | McBay | ................. | F24T 10/30 |
| | | | | 165/45 |
| 2016/0332891 A1* | 11/2016 | Balch | .................... | C02F 1/048 |
| 2016/0362309 A1* | 12/2016 | Kiahghadi | ............. | C02F 1/441 |
| 2019/0144308 A1* | 5/2019 | Kiaghadi | ................ | B01D 3/02 |
| | | | | 210/747.1 |

OTHER PUBLICATIONS

International Search Report Issued in Corresponding Application No. PCT/US2022/019518, dated May 30, 2022, 4 pages.
Written Opinion Issued in Corresponding Application No. PCT/US2022/019518, dated May 30, 2022, 8 pages.
Rahimi-Ahar et al., "Air Humidification-Dehumidification Process for Desalination: A review," Progress in Energy and Combustion Science, Apr. 2020, 32 pages.

* cited by examiner

HUMIDIFICATION DEHUMIDIFICATION PROCESSES USING WASTE HEAT EXTRACTED FROM ABANDONED WELLS

BACKGROUND

Water produced from oil fields is commonly produced together with oil and/or other downhole materials. For example, for every barrel of oil produced from oil fields worldwide, typically about 3 barrels of water is generated. Coproducing water with oil causes many challenges and limitations for treating the produced water. Additionally, produced water from onshore green fields and offshore/deep-water fields is expected to significantly increase in the next decade as these fields become more mature with time. It will become more difficult to treat and dispose of the increased water production, and thus, the management and handling of such vast quantities of water produced in oil fields poses a threat to the environment.

Methods used to handle water produced during the course of oil production have included demineralization technologies to remove salt and/or dissolved organics in order to meet surface water discharge standards. Once treated, the water may be discharged at the surface of the well and/or used for other purposes.

Demineralization techniques have included membrane-based desalination processes, such as reverse osmosis and electro dialysis, in combination with pretreatment filtering techniques. Thermal separation processes have also been used, including heat-based desalination techniques such as multi-stage flash desalination and humidification dehumidification. However, such desalination processes use large amounts of energy in order to heat the water and run the desalination equipment, which may have a net effect of being more damaging to the environment.

SUMMARY OF INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods of purifying water that include providing a humidification-dehumidification unit proximate one or more abandoned wells, circulating a water feed through the one or more abandoned wells, using geothermal heat in the one or more abandoned wells to heat the water feed, directing the heated water feed to the humidification-dehumidification unit, and treating the heated water feed in the humidification-dehumidification unit to provide purified water.

In another aspect, embodiments disclosed herein relate to methods for desalinating a produced water feed that include circulating a water feed through one or more abandoned wells until a temperature of the water feed reaches at least 60° C., directing the heated water feed to at least one desalination unit, and treating the heated water feed in the at least one desalination unit to provide purified water from the heated water feed.

In yet another aspect, embodiments disclosed herein relate to systems that include production tubing extending through at least one abandoned well, wherein an annulus is formed between the production tubing and a wellbore wall of the at least one abandoned well, at least one source of water feed fluidly connected to an opening to the annulus, at least one pump fluidly connected between the at least one source of water feed and the annulus, and a humidification-dehumidification unit having at least one humidification chamber fluidly connected to the production tubing, at least one condensation chamber fluidly connected to the at least one humidification chamber, a waste water outlet fluidly connected to the at least one humidification chamber, and a purified water outlet fluidly connected to the at least one condensation chamber.

Other aspects and advantages of the invention will be apparent from the following description and the appended claims.

DETAILED DESCRIPTION

Figure 1:
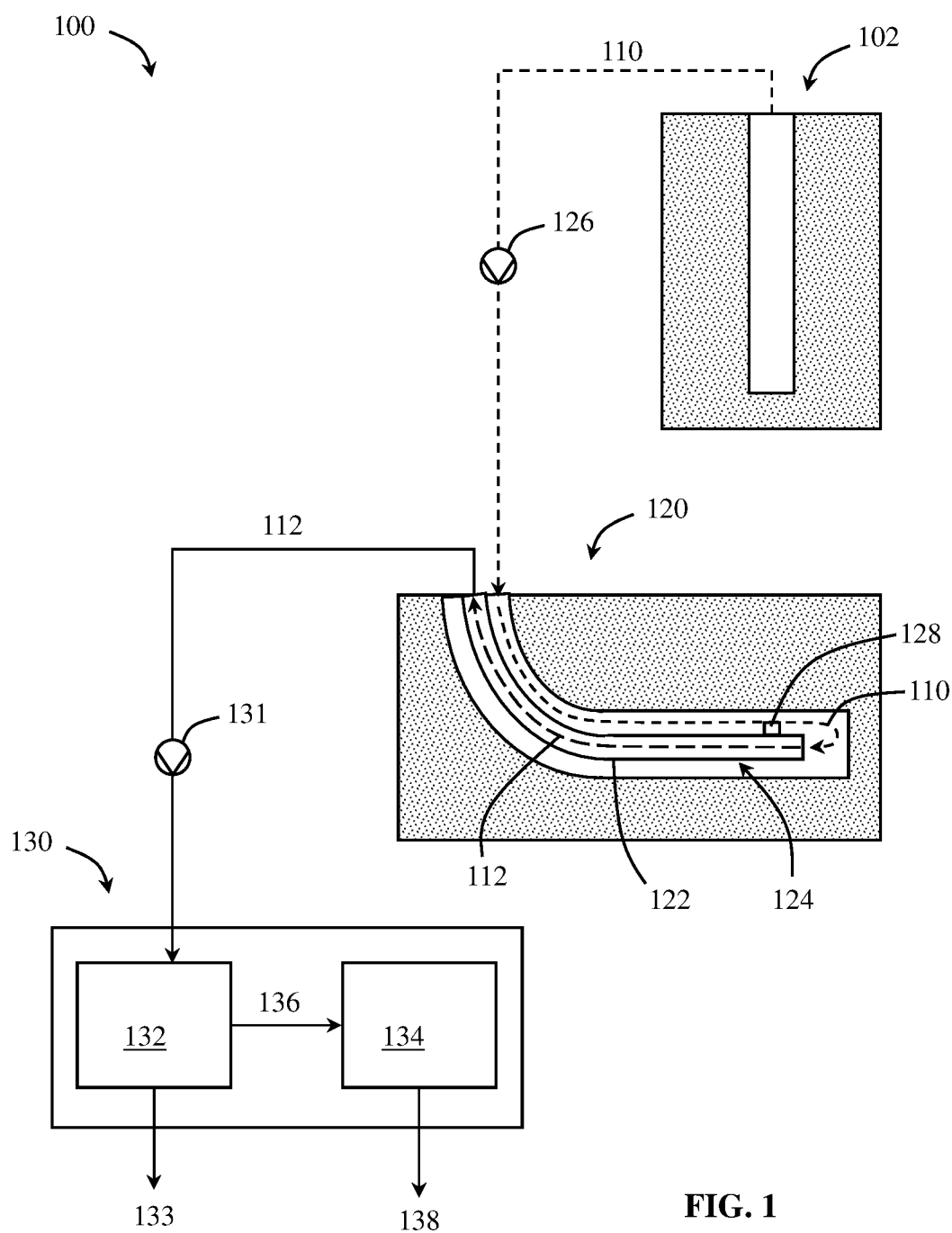
FIG. 1 shows a system according to embodiments of the present disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein relate generally to methods and systems that circulate water produced from an active well through one or more abandoned wells and use the geothermal heat from the abandoned well(s) to heat the produced water for desalination. Produced water that is heated in one or more abandoned wells may be directly flowed from the abandoned well(s) to one or more water purification processes that use heated feed water as part of the process of purifying the water, such as a multi-effect distillation process, a multi-effect evaporation process, a membrane distillation process, a humidification-dehumidification (HDH) process, or other desalination processes.

As used herein, "water feed" may include water produced from an active well, water provided from a storage reservoir, or water from other water sources that is heated according to embodiments of the present disclosure for feeding into one or more water purification processes. For example, water feed may include water produced directly from an active well without intermediate filtering processes or water produced from an active well that has undergone one or more filtration processes prior to being fed into an water purification process. In some embodiments, water produced from an active well may be sent through one or more filtration processes to separate oil and/or particulate matter from the water, where the filtered water may then be heated through one or more abandoned wells and sent as water feed to a water purification process.

A water feed may be circulated through one or more abandoned wells until the water feed reaches a desired preheat temperature for a water purification process, and then the heated water feed may be sent directly to the water purification process for water purification, e.g., desalination. The preheat temperature may be selected, for example, based on the water purification process being used. For example, in some embodiments, water feed may be circulated in one or more abandoned wells until the water feed reaches a temperature of at least 60° C., and then the heated water feed may be fed directly to an HDH process to purify the water feed.

HDH processes may include evaporating water from the heated water feed and then condensing the evaporated water to provide purified water. For example, FIG. 1 shows a schematic diagram of a system 100 using an HDH process for water purification according to embodiments of the present disclosure. As shown, a water source may be provided from an active well 102. For example, a fluid may be produced from an active well 102, where water may be separated from the produced fluid to provide the water feed 110. In some embodiments, water filtered after production from an active well may be stored prior to using as water feed. Although FIG. 1 shows an active well 102 as a water source, other sources of water may be used to provide water feed for water purification methods according to embodiments of the present disclosure.

The water feed 110 may be directed to and circulated through at least one abandoned well 120 for heating the water feed 110. In such manner, the abandoned well(s) 120 may act as a geothermal heat source to heat the water feed 110. An abandoned well may include a previously drilled well that is not in production. For example, an abandoned well 120 may include a completed well, including production tubing and casing, that was at one time producing fluids, but no longer produces fluids. Additionally, an abandoned well 120 may be a well that has dried up or a well that was sealed at a certain depth within the well to prevent further production. In some embodiments, an abandoned well 120 may include a partially completed well that was abandoned during an exploration phase.

According to embodiments of the present disclosure, production tubing 122 may be deployed through the abandoned well 120. Production tubing 122 may be deployed prior to using the abandoned well 120 as a geothermal heat source, for example, where the production tubing 122 was used during previous production activities and remained in the well, or production tubing 122 may be deployed for purposes of using the abandoned well as a geothermal heat source. Production tubing 122 may extend through a depth of the abandoned well 120 (e.g., a partial depth or an entire depth of the well), where an annulus 124 is formed between the wellbore wall and the production tubing 122. The wellbore wall may be lined, e.g., with casing and/or lining, may be an exposed borehole wall, or may be partially lined and partially exposed borehole wall. However, it may be advantageous to select an abandoned well that is mostly or entirely lined to inhibit additional particulate matter or fluids from entering the water feed 110 as it is circulated through the abandoned well, thereby reducing subsequent levels of purification.

Water feed 110 may be directed through the annulus 124 formed around the production tubing 122 to be circulated through the abandoned well(s) 120. For example, a flow path formed of at least one of piping, valves, and fittings may extend from a water source to an opening to the annulus. At least one pump 126 may be fluidly connected along the flow path between water source(s) and the annulus 124 of the abandoned well 120. The pump(s) 126 may be controlled, e.g., through one or more control panels, to control the flow rate of the water feed 110 being flowed through the abandoned well(s) 120. The pump(s) 126 may be remotely controlled, controlled on site, automatically controlled according to one or more preselected pump rate plans, and/or manually controlled. For example, a pump 126 may be controlled to adjust the flow rate of the water feed 110 based on the temperature of the water feed 110 being circulated through the abandoned well(s).

In some embodiments, at least one downhole temperature sensor 128 may be provided in the abandoned well 120 to monitor the temperature of the water feed 110. The temperature measurements may be sent to the surface of the abandoned well 120 (e.g., wirelessly or through telemetry systems), where the temperature measurements may be analyzed and used for determining next steps in the heating and water purification processes. For example, downhole temperature of the water feed 110 may be monitored via the downhole temperature sensor(s) 128, and based on the measured temperature of the water feed 110, the pump(s) 126 may continue to circulate the water feed 110 in the abandoned well 120 until the water feed 110 temperature reaches a preselected temperature. When the water feed 110 reaches the preselected temperature, the heated water feed 112 may be pumped through the production tubing 122 to the surface of the abandoned well 120, where it may be directed to a water purification process to be purified. The preselected temperature may be selected based on heating requirements of the subsequent water purification process the water feed is to be sent. For example, the water feed 110 may be heated to at least 60° C. before pumping the heated water feed 112 to the surface to be purified using a subsequent HDH processes.

The heated water feed 112 may be pumped from the abandoned well(s) 120 to one or more water purification processes. For example, in the system 100 shown in FIG. 1, an HDH unit 130 may be fluidly connected to the production tubing 122 of the abandoned well 120 to purify the heated water feed 112 using an HDH process after being circulated through the abandoned well 120. HDH processes may be performed at or around atmospheric pressure.

An HDH process may be performed using one or more HDH units 130, which may each generally include at least one humidification chamber 132, where the heated water feed 112 may be mixed with air to evaporate water from the feed, and at least one condensation chamber 134 for collecting the evaporated water. The humidification chamber(s) 132 may be fluidly connected to the production tubing 122 of the abandoned well 120, such that the heated water feed 112 may be directly fed to the water purification process after being heated in the abandoned well 120. In some embodiments, at least one of a transfer pump 131, a choke, a valve, and/or other flow control device may be positioned along a flow path fluidly connecting the HDH unit 130 to the production tubing 122, which may be used to control the flow rate of the heated water feed 112 to the HDH unit 130 for desalination.

In an HDH process, the heated water feed 112 may be directed to the humidification chamber(s) 132 of the HDH unit(s) 130 to form water vapor 136 from the heated water feed 112. The heated water feed 112 may be mixed with air (e.g., ambient air) to generate the water vapor 136. For example, one or more blowers may be connected to the humidification chamber 132 to blow outside air into the humidification chamber 132. In some embodiments, an HDH unit 130 may have a distribution system, such as a sprayer, mister, or drip system, for introducing the heated water feed 112 into the humidification chamber 132, such that the heated water feed 112 may be mixed with the air inside the humidification chamber 132 to form water vapor 136.

As water is evaporated from the heated water feed 112, a waste water 133 (e.g., brine or other mixture of water with impurities) may remain from the unevaporated portion of the feed, which may be drained from the humidification chamber 132 via one or more waste water outlets fluidly connected to the humidification chamber 132. Waste water 133 may be disposed of, stored, or recirculated through one or more water purification processes.

The water vapor 136 generated in the humidification chamber(s) 132 may be directed to the fluidly connected condensation chamber(s) 134 via one or more flow paths. In the condensation chamber(s) 134, the water vapor 136 may be collected and condensed to provide purified water 138. The purified water 138 may exit the HDH unit 130 via at least one purified water outlet fluidly connected to the condensation chamber(s) 134. The purified water 138 may be used for a drilling operation, disposed of underground, stored, sent through one or more additional water purification processes, and/or reused for other purposes.

Systems and methods according to embodiments of the present disclosure may utilize abandoned wells that are vertical wells, horizontal wells, or other directionally drilled wells as a geothermal heat source. Further, water feed may be circulated through one or more abandoned wells to heat the water feed prior to being purified using one or more water purification processes.

Figure 2:
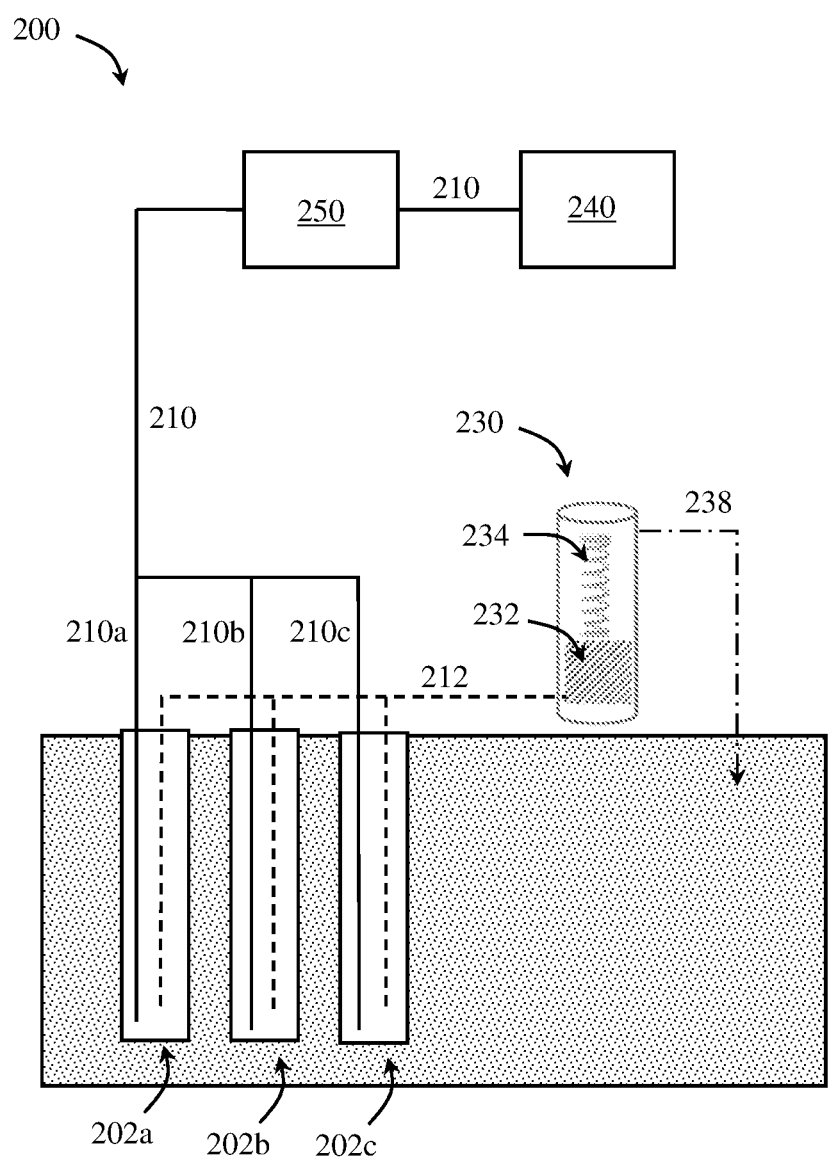
FIG. 2 shows a system according to embodiments of the present disclosure used with vertical abandoned wells.

For example, FIG. 2 shows an example of a system 200 according to embodiments of the present disclosure utilizing multiple vertical abandoned wells 202a, 202b, 202c (collectively referred to as 202) for heating a water feed prior to being purified through an HDH unit 230. The system 200 shown in FIG. 2 may further include at least one separator 240 and at least one storage tank 250 or reservoir. One or more separators 240 may be used to pre-filter a water source, for example, to separate oil, gas, or other hydrocarbon material from a fluid produced from an active well and/or to separate particulate matter from the water source (e.g., where the separator may be a shaker). Storage tank(s) 250 may be used to store the water feed prior to being heated through the abandoned wells 202.

According to embodiments of the present disclosure, methods for purifying water produced from an active well may include sending production fluid through one or more separators 240, e.g., to separate produced hydrocarbons from the produced water. Produced water may be flowed through one or more separators 240 and/or other types of filters to provide produced water with a minimum purity level (e.g., to remove cuttings or debris over a selected size, to remove a selected percentage of hydrocarbons from the water, etc.). In some embodiments, one or more sensors may be provided along a produced water conduit to monitor the purity of the produced water. For example, in some embodiments, produced water may be separated from other fluids and/or particulates, and one or more in-line salinity sensors may monitor the salinity of the produced water, where the produced water salinity ranges from 50,000-250,000 TDS before being fed into an abandoned well.

After separating produced water from production fluids, the water feed 210 may be stored in at least one storage tank 250. The water feed 210 from the storage tank(s) 250 may then be directed to one or more abandoned wells 202 to heat the water feed to a minimum temperature. For example, as shown in FIG. 2, the water feed 210 may be split into multiple water feed streams (210a, 210b, and 210c) and circulated through multiple abandoned wells 202. Water feed streams 210 may be split and directed to different abandoned wells 202, for example, using one or more valves (e.g., three way valves, isolation valves, etc.) to selectively close or open different flow paths to the different abandoned wells 202 and/or using one or more pumps to pump the water feed into the abandoned wells 202 at selected flow rates.

As each water feed stream 210 is circulated through the abandoned wells 202, geothermal heat from the abandoned wells may heat the water feed 210. The water feed 210 may be heated within the abandoned wells 202 until the water feed 210 reaches a minimum temperature required for a selected subsequent water purification process. For example, one or more pumps and/or valves may be used to control the flow rate of water feed 210 flowing through an abandoned well 202, where a relatively slower flow rate may allow the water feed 210 to heat longer to increase the temperature of the water feed 210, and a relatively faster flow rate may allow the water feed 210 to heat for less time to provide a relatively lower temperature of the water feed 210. A pump may be used to control the flow rate of the water feed 210 being pumped into an abandoned well 210. In some embodiments, flow control devices and/or valves may be used to control the flow rate of water feed 210 being pumped into an abandoned well 210 and/or to control the back pressure of water feed 210 in the abandoned well 210.

The heating temperature in an abandoned well 210 may be strongly correlated with the well depth from the surface. For example, as water feed 210 is pumped deeper into a well from the surface, the temperature in the abandoned well 210 may increase, which may heat the water feed 210 to higher temperatures. Downhole temperatures may range, for example, from about 100° C. to about 200° C., depending on the depth from the surface of the well. Additionally, water feed 210 circulation through an abandoned well may be a function of time in the well and well depth. For example, a vertical well flow range may be about 1,000-5,000 barrels/day and circulation time of 6-12 hours, while a horizontal well may have a larger feed circulation of about 2,000-10,000 barrels/day and a longer circulation time of 12-24 hours.

In the embodiment shown in FIG. 2, at least one HDH unit 230 may be provided proximate to the abandoned wells 202 (e.g., within about 2,000 ft of an abandoned well). Production piping may be fluidly connected between wellhead equipment of the abandoned wells 202 and the HDH unit(s) 230, through which the heated water feed 212 may be directed from the abandoned wells 202 to the HDH unit(s) 230. In some embodiments, production piping between the abandoned well(s) 202 and HDH unit(s) 230 may be at least partially insulated to retain heat as the heated water feed 212 flows to the HDH unit(s) 230.

When directed to an HDH unit 230, the heated water feed 212 may be flowed to at least one humidification chamber 232 within the HDH unit 230, where water may be evaporated from the heated water feed 212. The water vapor generated from the at least one humidification chamber 232 may then be collected in at least one condensation chamber 234 of the HDH unit 230 as purified water 238. Thus, the HDH unit 230 may be used to treat the heated water feed 212 to provide purified water 238. In such manner, water may be continuously or intermittently withdrawn from a water source to be heated in one or more abandoned wells 202 and then sent to a water purification process to be purified. In some embodiments, the purified water 238 may be discharged into a reservoir.

In the embodiment shown in FIG. 2, water feed 210 may be circulated through at least two different abandoned wells 202 (e.g., three abandoned wells 202a, 202b, 202c, or more). In some embodiments, water feed may be circulated through a single abandoned well one or more times before being directed to a water purification process (e.g., HDH unit 230). For example, one or more valves and piping may be provided with wellhead equipment at the surface of an abandoned well, which may be used to selectively either redirect water feed from production tubing in the abandoned well back to the annulus of the abandoned well to recirculate the water feed in the abandoned well, or to direct the water feed from the production tubing to a water purification process to be purified. Water feed may be recirculated back through an abandoned well to further heat the water feed until the water feed reaches a minimum temperature (e.g., at least 60° C., at least 70° C., or at least 80° C., depending on the subsequent water purification process used to purify the water feed).

In some embodiments, water feed 210 may be pumped through at least one vertical abandoned well at a rate of about 1,000 to 5,000 barrels/day or through at least one horizontal abandoned well at a rate of about 2,000 to 10,000 barrels/day. After being circulated through the one or more abandoned wells, the heated water feed 212 may be sent to one or more HDH units 230 to treat the heated water feed 212 at substantially the same rate that the heated water feed 212 is being produced from the one or more abandoned wells, e.g., treating the heated water feed 212 at a rate of about 1,000 to 5,000 barrels/day when heated through vertical abandoned well(s) or at a rate of about 2,000 to 10,000 barrels/day when heated through horizontal abandoned well(s).

The embodiment shown in FIG. 2 provides an example of a system and method using vertical abandoned wells 202 as a geothermal heat source to heat the water feed 210. Vertical abandoned wells 202 may extend substantially vertically through a formation, and production tubing may extend substantially coaxially through the well. However, as provided above, systems and methods according to embodiments of the present disclosure may also utilize horizontal or other directionally drilled wells that have been abandoned. For example, using a horizontal abandoned well as a geothermal heat source may provide an extended exposure to a geothermal formation when compared with a vertical abandoned well, which may advantageously provide increased amounts of heat transfer to the water feed being circulated therethrough. In addition, horizontal wells may have a higher throughput when compared with a vertical well, and thus, higher volumes of water feed may be heated when compared to a vertical well.

Figure 3:
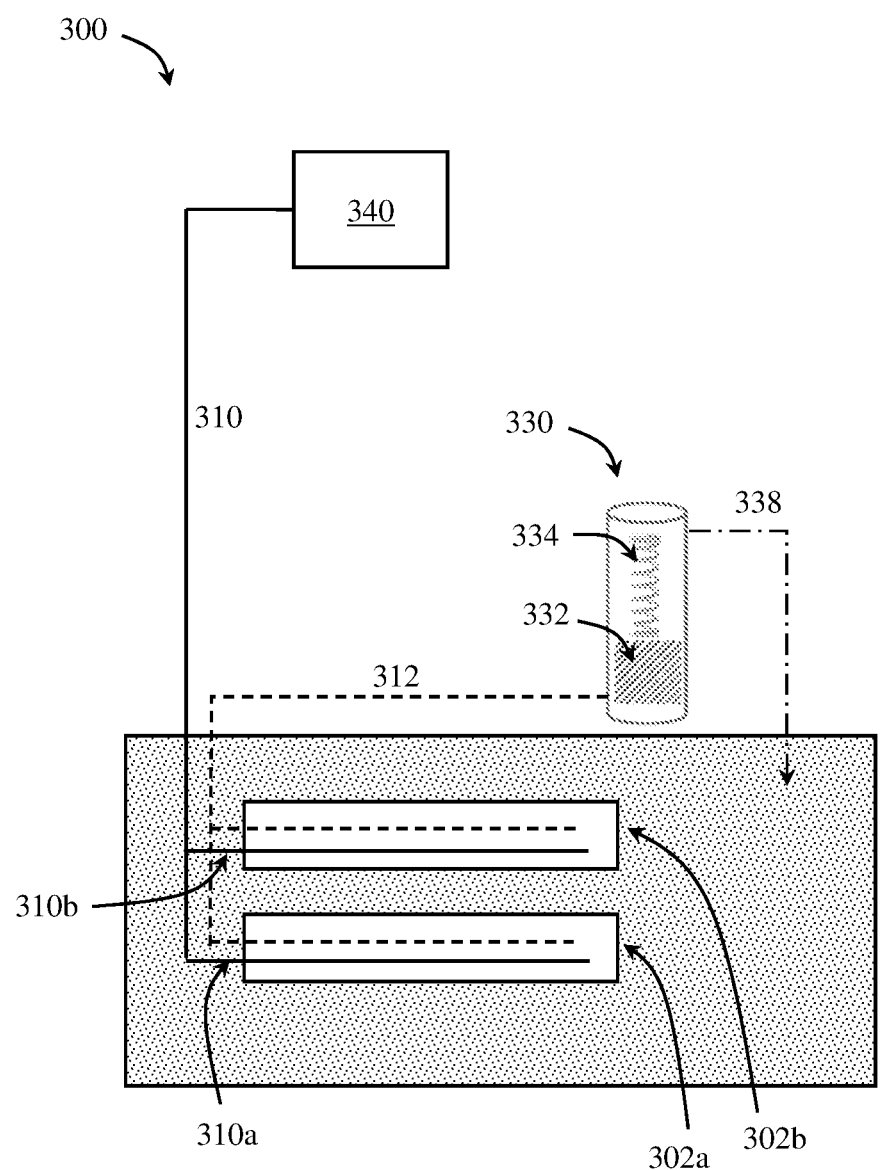
FIG. 3 shows a system according to embodiments of the present disclosure used with horizontal abandoned wells.

For example, FIG. 3 shows another example of a system 300 according to embodiments of the present disclosure that may be provided around one or more horizontal abandoned wells 302. While two abandoned wells 302a, 302b (collectively referred to as 302) are shown, one or more than two abandoned wells may be used. The abandoned wells 302 may extend substantially horizontally through a formation, and production tubing may extend substantially coaxially through the well.

The system 300 shown in FIG. 3 may include at least one water source 340, which may be held in a storage tank or reservoir. For example, the water source 340 may be a water solution that has been filtered from production fluids collected from one or more active wells. The system 300 may also include one or more water purification units, such as an HDH unit 330, located proximate to the abandoned wells 302 (e.g., within a few hundred feet of wellhead equipment at the opening to an abandoned well). The system 300 may further include piping, valves, flow control devices, and other manifold equipment that may be used in directing a water feed 310 from the water source 340 to the abandoned well(s) 302 and from the abandoned well(s) 302 to the HDH unit 330. One or more sensors may also be provided in the system 300, for example, to monitor temperature, pressure, and/or flow rate of the water feed 310.

According to embodiments of the present disclosure, methods for purifying water may include directing the water feed 310 from a water source 340 to one or more abandoned wells 302 to heat the water feed 310 to a minimum temperature. For example, as shown in FIG. 3, the water feed 310 may be split into multiple water feed streams (310a, 310b) and circulated through multiple abandoned wells 302a, 302b. Water feed streams 310 may be split and directed to different abandoned wells 302, for example, using one or more valves (e.g., three way valves, isolation valves, etc.) to selectively close or open different flow paths to the different abandoned wells 302 and/or using one or more pumps to pump the water feed into the abandoned wells 302 at selected flow rates.

As each water feed stream 310 is circulated through the abandoned wells 302, geothermal heat from the abandoned wells may heat the water feed 310. The water feed 310 may be heated within the abandoned wells 302 until the water feed 310 reaches a minimum temperature required for a selected subsequent water purification process, e.g., an HDH desalination process in HDH unit 330. According to embodiments of the present disclosure, one or more temperature sensors may be provided downhole in the abandoned wells 302 to determine when the water feed 310 has reached the minimum temperature. In some embodiments, the temperature of the water feed 310 may be monitored at the surface of the abandoned wells 302. When the water feed 310 reaches the minimum temperature, the heated water feed 312 may be directed from the abandoned wells 302 to the HDH unit 330.

When directed to the HDH unit 330, the heated water feed 312 may be flowed to at least one humidification chamber 332 within the HDH unit 330, where water may be evaporated from the heated water feed 312. A humidification chamber 332 may include, for example, a chamber or housing that is capable of temporarily holding the heated water feed 312 and capable of introducing air to the heated water feed 312. For example, a humidification chamber 332 may include a container that has at least one feed entry port (through which the heated water feed 312 may enter the container), at least one air port (through which air may be flowed into), at least one vapor exit port (through which water vapor may exit the container), and at least one drainage port (through which waste water remaining after vaporization may exit the container). The water vapor generated from the at least one humidification chamber 332 may be flowed into at least one condensation chamber 334 of the HDH unit 330. A condensation chamber 334 may include, for example, one or more coils and/or differently shaped container that provide increased surface area around the flowing water vapor to aid in cooling and condensing the water vapor to provide purified water 338. In such manner, the HDH unit 330 may be used to treat the heated water feed 312 to provide purified water 338. The purified water 338 may be discharged into a reservoir or reused, for example.

According to embodiments of the present disclosure, methods of purifying a water feed having one or more solutes or contaminants may include using one or more abandoned wells to preheat the water feed to a minimum temperature needed for the purification process. For example, desalination processes may include heating a water feed to at least 60° C. in order to separate pure water from the water feed.

Figure 4:
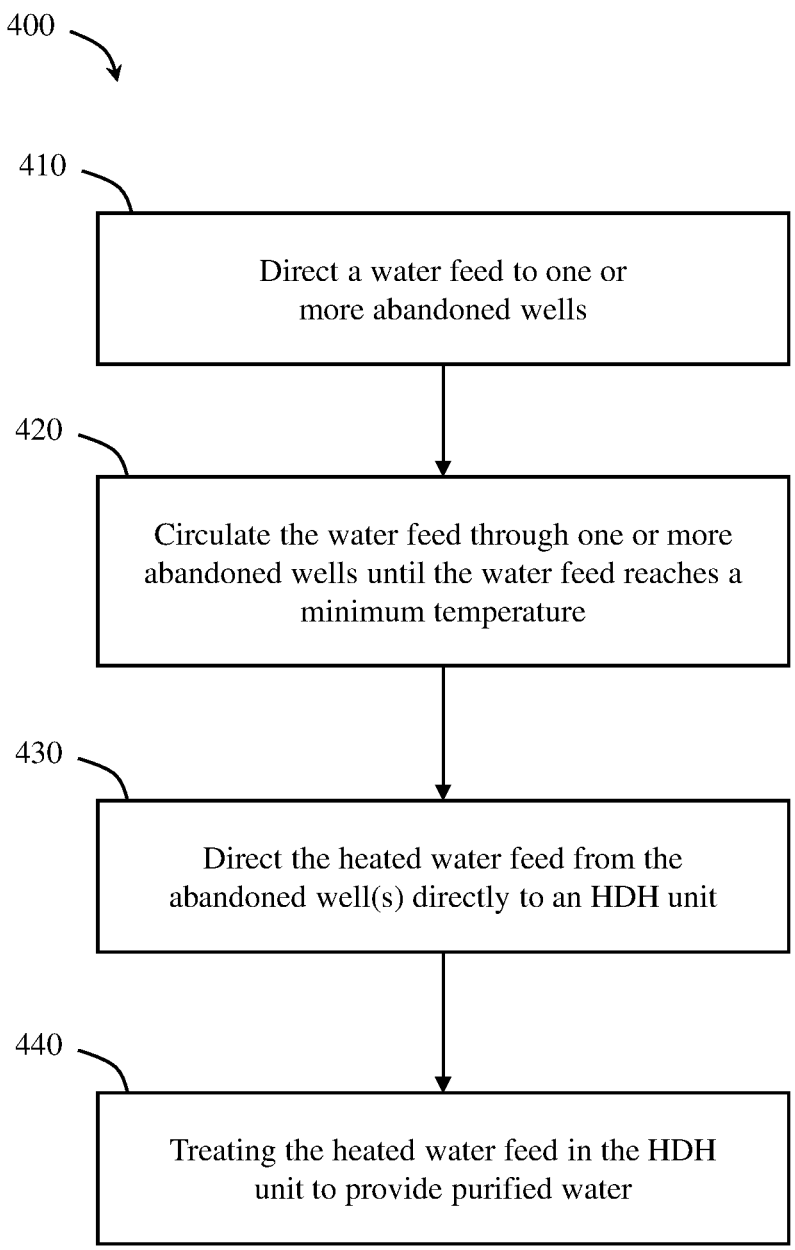
FIG. 4 shows a method according to embodiments of the present disclosure.

FIG. 4 shows an example of a method according to embodiments of the present disclosure using an HDH process to purify a water feed. The method 400 may include directing a water feed to one or more abandoned wells (step 410). The water feed may be provided from a water source, for example, from produced fluids from an active well by initially separating the water feed from the produced fluids in one or more separation processes (e.g., separating oil and/or gas from the produced fluids, flowing the produced fluids through one or more shakers, etc.). The water feed may be directed to one or more abandoned wells using production piping, where the water feed may enter the abandoned well(s) through wellhead equipment assembled at the openings to the abandoned well(s).

The water feed may then be circulated through one or more abandoned wells until the water feed reaches a minimum temperature (step 420). Water feed may be circulated through an abandoned well by injecting the water feed through an annulus formed between production tubing extending through the abandoned well and the wellbore wall. The abandoned well may have had at least a portion of the wellbore wall cased and/or lined and the production tubing installed from a previous operation. For example, an abandoned well may have had its wellbore wall cased and production tubing installed to collect hydrocarbons from a formation in a recovery operation, and then was subsequently abandoned. In instances where an abandoned well had previously been cased/lined and production tubing installed (e.g., from a recovery operation), the abandoned well may be substantially ready for use as a geothermal heat source in water purification methods of the present disclosure, where little or no extra cost is needed to prepare the abandoned well to receive a water feed.

In some embodiments, a previously abandoned well may not have production tubing installed and/or may not have had the wellbore wall cased or lined before the well was abandoned. In such instances, methods according to embodiments of the present disclosure may include installing production tubing and/or casing in the abandoned well prior to circulating the water feed through the abandoned well.

As the water feed is circulated through the abandoned wells, the water feed may be pumped into and through the annulus of the well, to the bottom of the well, and then return to the top of the well through the production tubing. In some embodiments, the water feed may be circulated through one or more abandoned wells until the water feed reaches at least 60° C. (e.g., between 60° C. and 80° C.) when exiting the abandoned well. For example, the water feed may be recirculated through a single abandoned well until the water feed at the top of the well reaches at least 60° C., the water feed may be circulated through more than one abandoned well until the water feed at the top of a well reaches at least 60° C., or the water feed may reach at least 60° C. after being circulated once through a single abandoned well. In some embodiments, the flow rate of the water feed may be controlled (e.g., using a pump or flow control device) to allow the water feed more or less time in the abandoned well, and thus more or less heat transfer time, depending on the desired minimum temperature of the water feed. The temperature of the water feed may be monitored, for example, using at least one downhole temperature sensor provided downhole in the abandoned well(s), using at least one temperature sensor at the surface of the abandoned well, or using a logging tool.

When the water feed reaches a minimum temperature, the heated water feed may be directed to at least one desalination unit, such as an HDH unit (step 430). The heated water feed may be first directed into at least one humidification chamber in the HDH unit, where water may be evaporated from the heated water feed. The evaporated water may be collected in at least one fluidly connected condensation chamber as purified water. After the heated water feed is treated in the HDH unit, the purified water may be discharged (step 440). In some embodiments, treated water capacity (the amount of purified water produced from the HDH unit) may range from about 800 to 8,000 barrels/day.

According to embodiments of the present disclosure, an HDH system may be used to treat produced water by utilizing the heat extracted from abandoned oil and gas wells. This can be achieved by having an HDH produced water desalination plant entirely operated by the heat extracted from the abandoned well(s), where the HDH system may utilize the waste heat to heat the water feed for the evaporation phase in the HDH system. Having a sufficient amount of such renewable heat may enable continuous operation of an integrated HDH-geothermal plant with a much lower carbon foot-print than conventionally operated HDH systems.

Methods disclosed herein may be useful for purifying water feed derived from one or more active wells in order to disposed of the produced water in a manner that meets safety and environmental standards. In some embodiments, one or more abandoned wells used for heating the water feed may be located close enough to an active well producing the water feed to have the water feed transported through piping between the active well and the abandoned well(s). In such cases where water produced from an active well may be transported through piping between the active well and the abandoned well(s), extra transportation costs may be avoided.

Further, by using abandoned wells as a geothermal heat source to heat water feed to a water purification process, operating costs for the purification process may be reduced. For example, costs associated with non-geothermal heating techniques (e.g., electric energy, fuel powered energy, solar panels, etc.) used in purification processes may be avoided. Additionally, extra costs of providing a dedicated geothermal heat source may be avoided by using an already drilled well (which had previously incurred drilling expenses for other purposes) that was later abandoned. In such manner, the use of heat extracted from abandoned wells in the form of geothermal energy may enable the utilization of waste heat associated with existing wells that are already available in most oil fields at zero cost. Further, by using geothermal energy from abandoned wells to heat the water feed for a water purification process, an alternative to heating the fluid using electricity or fuel power may be provided, which may lower $CO_2$ emissions to the environment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    providing a humidification-dehumidification unit proximate one or more abandoned wells;
    circulating a water feed through the one or more abandoned wells;
    using geothermal heat in the one or more abandoned wells to heat the water feed;
    directing the heated water feed to the humidification-dehumidification unit; and
    treating the heated water feed in the humidification-dehumidification unit to provide purified water.

2. The method of claim 1, wherein prior to circulating the water feed through the one or more abandoned wells, the method comprises filtering water produced from an active well to provide the water feed.

3. The method of claim 1, wherein the one or more abandoned wells comprises a horizontal well extending substantially horizontally through a formation.

4. The method of claim 1, wherein the one or more abandoned wells comprises a vertical well extending substantially vertically through a formation.

5. The method of claim 1, wherein the water feed is circulated through a single abandoned well multiple times before being directed to the humidification-dehumidification unit.

6. The method of claim 1, wherein the water feed is circulated through at least two different abandoned wells.

7. The method of claim 1, further comprising discharging the purified water into a reservoir.

8. A method, comprising:
    circulating a water feed through one or more abandoned wells until a temperature of the water feed reaches at least 60° C.;
    directing the heated water feed to at least one desalination unit; and
    treating the heated water feed in the at least one desalination unit to provide purified water from the heated water feed.

9. The method of claim 8, wherein the water feed is circulated until the temperature ranges between 60° C. and 80° C.

10. The method of claim 8, wherein prior to the circulating, the method further comprises:
    producing fluid from an active well; and
    separating water from the produced fluid to provide the water feed.

11. The method of claim 10, further comprising storing the water feed in at least one storage tank after separating the water and prior to circulating the water feed through the one or more abandoned wells.

12. The method of claim 10, wherein the water feed is split into multiple water feed streams and circulated through multiple abandoned wells.

13. The method of claim 8, further comprising using a pump to control a flow rate of the water feed being circulated through the one or more abandoned wells.

14. The method of claim 8, wherein at least one downhole temperature sensor is provided in the one or more abandoned wells, the method further comprising:
    monitoring the temperature of the water feed using the at least one downhole temperature sensor as the water feed circulates; and
    pumping the water feed to the at least one desalination unit when the at least one downhole temperature sensor measures the temperature of at least 60° C.

15. The method of claim 8, wherein the one or more abandoned wells are horizontal wells.

16. The method of claim 8, wherein the at least one desalination unit is a humidification-dehumidification unit.

* * * * *